United States Patent
Koyama (10) Patent No.: US 11,283,122 B2
(45) Date of Patent: Mar. 22, 2022

(54) BATTERY PACK

(71) Applicant: HONDA MOTOR CO., LTD., Tokyo (JP)

(72) Inventor: Rieko Koyama, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 78 days.

(21) Appl. No.: 17/011,297

(22) Filed: Sep. 3, 2020

(65) Prior Publication Data
US 2021/0066770 A1    Mar. 4, 2021

(30) Foreign Application Priority Data

Sep. 3, 2019  (JP) .............................. JP2019-160714

(51) Int. Cl.
*H01M 10/6556*  (2014.01)
*H01M 10/613*  (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ............. H01M 10/613; H01M 10/625; H01M 10/647; H01M 10/6554; H01M 10/6556;
(Continued)

(56) References Cited

U.S. PATENT DOCUMENTS

| 2004/0091758 A1* | 5/2004 | Kuriyama | H01M 8/04089 |
| | | | 429/427 |
| 2006/0214633 A1* | 9/2006 | Cho | H01M 10/6563 |
| | | | 320/112 |

(Continued)

FOREIGN PATENT DOCUMENTS

| CN | 109361037 A | 2/2019 |
| JP | S62-033505 A | 2/1987 |

(Continued)

OTHER PUBLICATIONS

Jul. 13, 2021, Japanese Office Action issued for related JP application No. 2019-160714.

*Primary Examiner* — Lingwen R Zeng
(74) *Attorney, Agent, or Firm* — Paratus Law Group, PLLC (57) ABSTRACT

A cooling mechanism of a battery pack includes a first refrigerant flow path provided on an opposite side of a partition wall from a first battery module, a second refrigerant flow path provided on the opposite side of the partition wall from a second battery module, and a connection flow path connecting respective one ends of the first refrigerant flow path in a forward-rearward direction to each other and the second refrigerant flow path to each other and extending in a leftward-rightward direction. The partition wall includes a plurality of pyramid-shaped convex portions arranged in a staggered manner along the forward-rearward direction and the leftward-rightward direction inside the first refrigerant flow path and the second refrigerant flow path, two diagonal lines of the convex portion are respectively arranged to coincide with the forward-rearward direction and the leftward-rightward direction.

7 Claims, 8 Drawing Sheets

(51) Int. Cl.
*H01M 10/625* (2014.01)
*H01M 10/647* (2014.01)
*H01M 10/656* (2014.01)
*H01M 2/10* (2006.01)
*H01M 2/04* (2006.01)
*H01M 50/20* (2021.01)
*H01M 50/147* (2021.01)
*H01M 10/6554* (2014.01)
*H01M 10/6567* (2014.01)
*H01M 50/249* (2021.01)

(52) U.S. Cl.
CPC ....... *H01M 10/647* (2015.04); *H01M 10/656* (2015.04); *H01M 50/147* (2021.01); *H01M 50/20* (2021.01); *H01M 10/6554* (2015.04); *H01M 10/6567* (2015.04); *H01M 50/249* (2021.01); *H01M 2220/20* (2013.01); *Y02E 60/10* (2013.01)

(58) Field of Classification Search
CPC ........... H01M 10/656; H01M 10/6567; H01M 2220/20; H01M 50/147; H01M 50/20; H01M 50/249; Y02E 60/10
See application file for complete search history.

(56) References Cited

U.S. PATENT DOCUMENTS

| | | | |
|---|---|---|---|
| 2009/0114372 A1* | 5/2009 | Ippoushi | F28F 3/12 165/104.14 |
| 2013/0149582 A1 | 6/2013 | Kimura et al. | |
| 2018/0241102 A1 | 8/2018 | Kim et al. | |
| 2019/0044203 A1 | 2/2019 | Haag et al. | |

FOREIGN PATENT DOCUMENTS

| | | |
|---|---|---|
| JP | 2010-015788 A | 1/2010 |
| JP | 2013-122818 A | 6/2013 |
| JP | 2014-215250 A | 11/2014 |
| JP | 2016-151391 A | 8/2016 |
| JP | 2016-162527 A | 9/2016 |
| JP | 2018-533167 A | 11/2018 |
| WO | WO 2007/032056 A1 | 3/2007 |

* cited by examiner

BATTERY PACK

CROSS REFERENCE TO RELATED APPLICATIONS

This application claims priority to Japanese Patent Application No. 2019-160714 filed on Sep. 3, 2019, the content of which is incorporated herein by reference.

TECHNICAL FIELD

The present disclosure relates to a battery pack mounted on an electric vehicle or the like.

BACKGROUND ART

In related arts, battery packs have been mounted on electric vehicles and the like. The battery pack includes a battery module configured by stacking a plurality of cells. The cells need to be cooled because they are likely to degrade when left at high temperatures. For example, in JP2013-122818A, a battery module is installed on a cooling plate to which a refrigerant is supplied.

However, in JP2013-122818A, since the air cooling type cooling plate is used, a very high cooling efficiency cannot be expected. The liquid cooling type is superior in terms of the cooling efficiency, but it is still necessary to further increase the cooling efficiency even for a liquid cooling type battery module.

SUMMARY OF INVENTION

An object of the present disclosure is to provide a battery pack capable of improving the cooling performance of the battery module.

According to an aspect of the present disclosure, a battery pack includes: a plurality of battery modules configured by stacking a plurality of cells in a first direction; and a cooling mechanism for cooling the plurality of battery modules with a liquid medium. The plurality of battery modules include at least a first battery module and a second battery module arranged side by side in a second direction orthogonal to the first direction. The cooling mechanism includes: a first refrigerant flow path provided on an opposite side of a partition wall from the first battery module in a third direction orthogonal to the first direction and the second direction; a second refrigerant flow path provided on the opposite side of the partition wall from the second battery module in the third direction; and a connection flow path connecting respective first ends in the first direction of the first refrigerant flow path and the second refrigerant flow path to each other and extending in the second direction. The partition wall includes a plurality of convex portions arranged in a staggered manner along the first direction and the second direction inside the first refrigerant flow path and the second refrigerant flow path, each convex portion has a pyramid shape, one of two diagonal lines of the convex portion is arranged to coincide with the first direction, and another one of the two diagonal lines of the convex portion is arranged to coincide with the second direction.

DESCRIPTION OF EMBODIMENTS

Hereinafter, a battery unit including a battery pack according to an embodiment of the present disclosure will be described with reference to the accompanying drawings. In the drawings, the forward direction of the battery unit is indicated by Fr, the rearward direction by Rr, the leftward direction by L, the rightward direction by R, the upward direction by U, and the downward direction by D. The forward, rearward, leftward, rightward, upward, and downward directions of the battery unit are independent of those of the vehicle in which the battery unit is mounted.

Battery Unit

Figure 1:
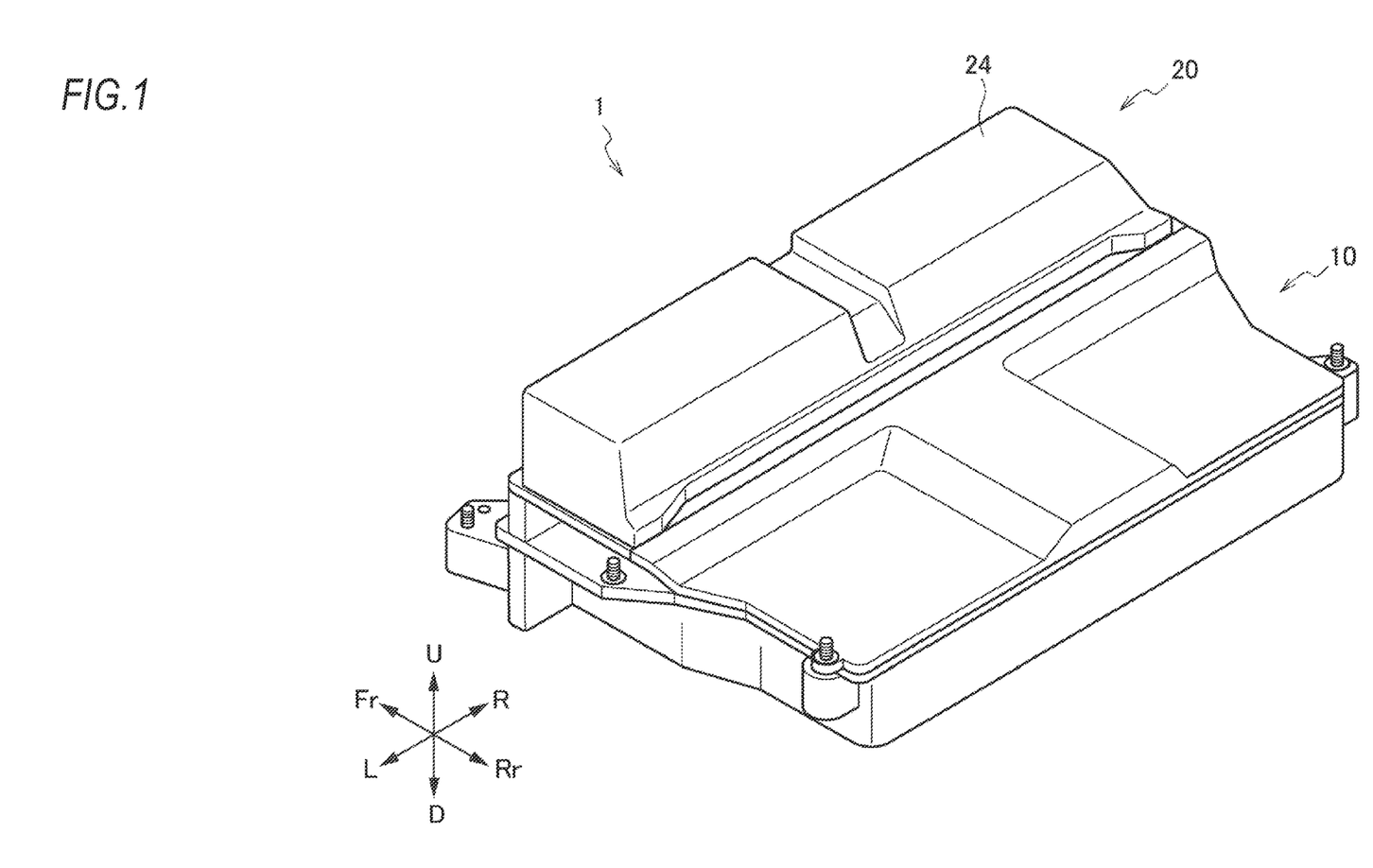
FIG. 1 is a perspective view showing a battery unit including a battery pack according to an embodiment of the present disclosure.
Figure 2:
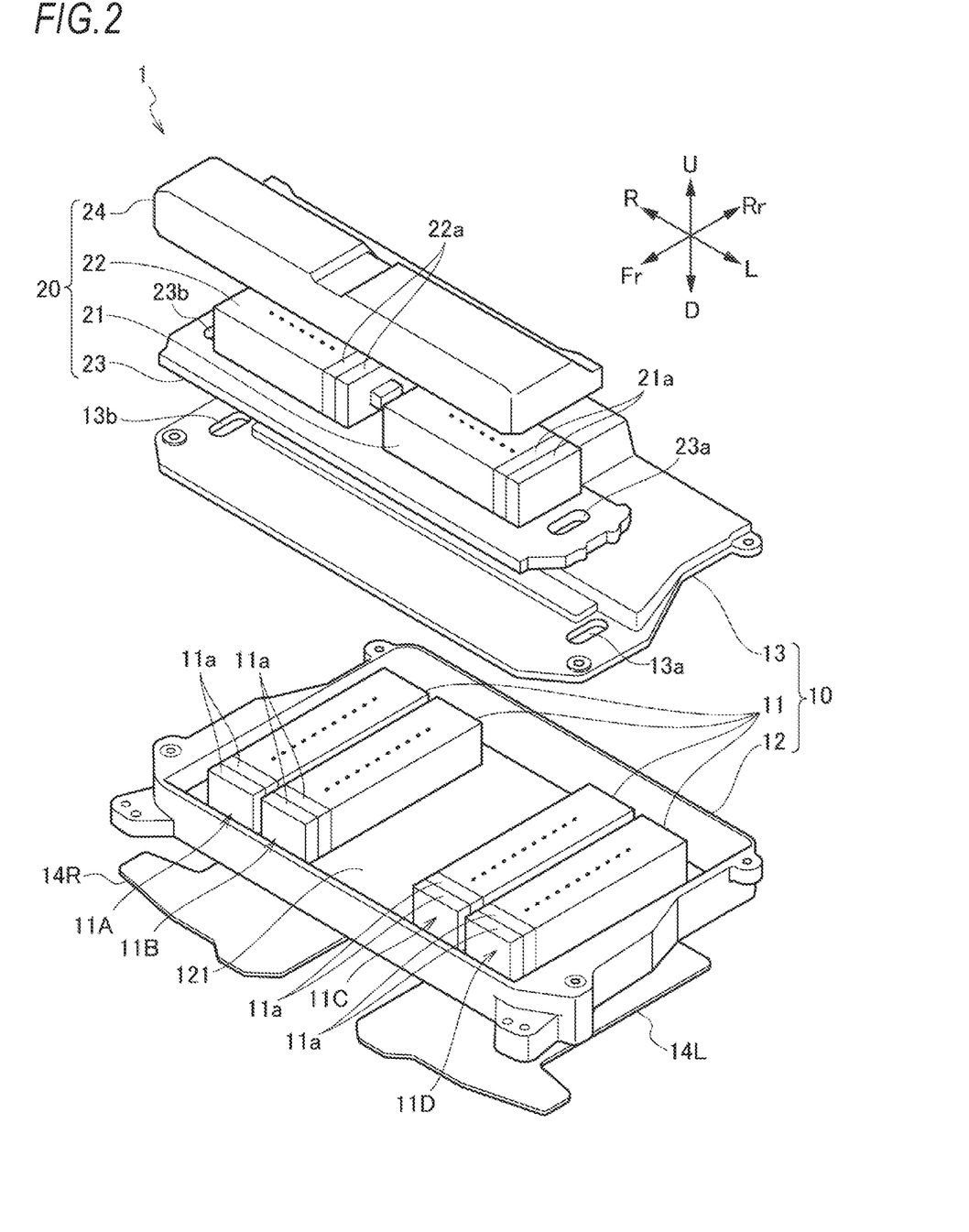
FIG. 2 is an exploded perspective view showing the battery unit shown in FIG. 1.

As shown in FIGS. 1 and 2, the battery unit 1 in an exemplary embodiment includes a first battery pack 10 and a second battery pack 20 arranged above the first battery pack 10.

As shown in FIG. 2, the first battery pack 10 includes a plurality of battery modules 11 (in the present example, four battery modules 11A, 11B, 11C, 11D), a first battery case body 12 that accommodates the battery modules 11, a first battery case cover 13 that closes an opening of the first battery case body 12, and a first cooling mechanism 40A (see FIG. 5) that cools the battery modules 11.

Each of the battery modules 11 (11A, 11B, 11C, 11D) is a cell stack configured by stacking a plurality of cells 11a in a forward-rearward direction. Four battery modules 11 (11A, 11B, 11C, 11D) are arranged side by side in a leftward-rightward direction orthogonal to the forward-rearward direction.

Among the four battery modules 11 (11A, 11B, 11C, 11D), two battery modules 11A. 11B are accommodated in a right side region of the first battery case body 12, and the other two battery modules 11C, 11D are accommodated in a left side region of the first battery case body 12. Hereinafter, among the two battery modules 11A. 11B accommodated in the right side region of the first battery case body 12, the battery module 11A located on the right side is referred to as the first battery module 11A, and the battery module 11B located on the left side is referred to as the second-battery module 11B.

Figure 5:
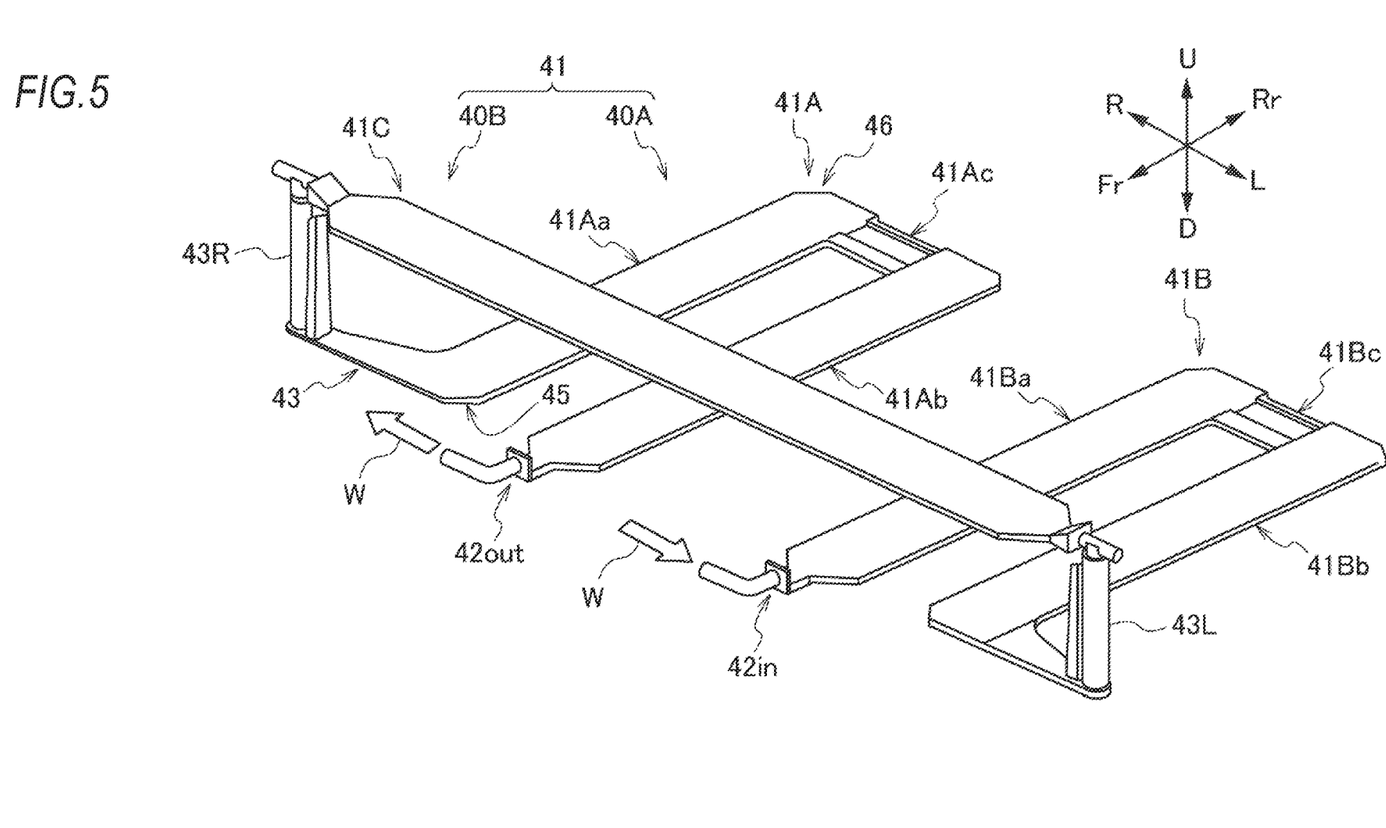
FIG. 5 is a perspective view showing a refrigerant flow path of the battery unit of FIG. 1.

The second battery pack 20 includes a second battery case body 23 mounted with two battery modules 21, 22, a second battery case cover 24 that covers the second battery case body 23, and a second cooling mechanism 40B that cools the battery modules 21, 22 (see FIG. 5). The battery modules 21, 22 are cell stacks configured by stacking a plurality of cells 21a, 22a in the leftward-rightward direction, respectively. The battery modules 21, 22 of the second battery pack 20 are arranged side by side in the leftward-rightward direction.

As shown in FIG. 2, a first communication hole 13a and a second communication hole 13b are provided in the vicinity of both ends of the first battery case cover 13 in the leftward-rightward direction. A first communication hole 23a and a second communication hole 23b in communication with the first communication hole 13a and the second communication hole 13b of the first battery case cover 13 are provided in the vicinity of both ends of the second battery case body 23 in the leftward-rightward direction. The battery module 11 of the first battery pack 10 and the battery modules 21, 22 of the second battery pack 20 are electrically connected by a conduction member (not shown) that passes through the first communication holes 13a, 23a and the second communication holes 13b, 23b.

Cooling Mechanism

Figure 3:
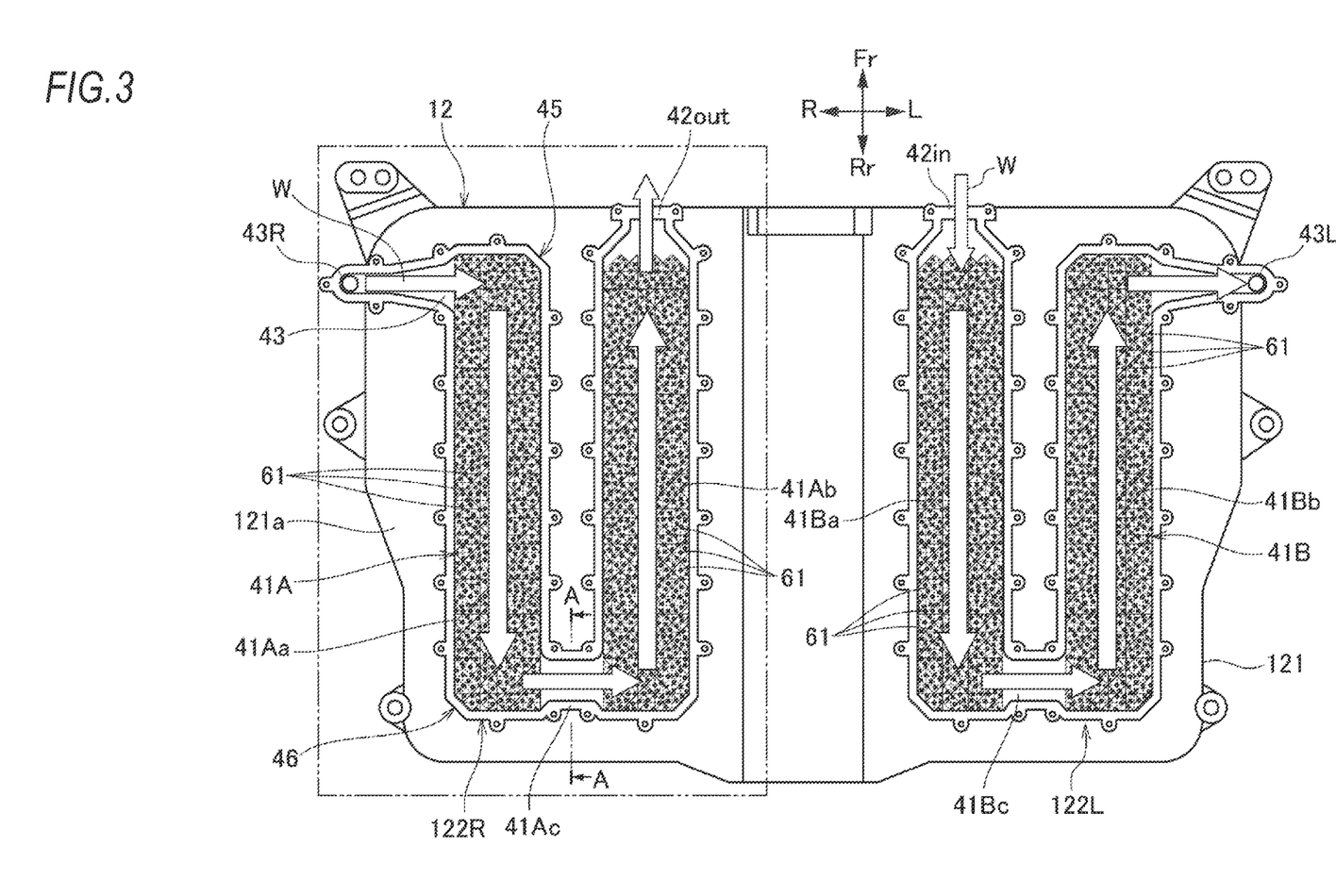
FIG. 3 is a bottom view showing a first battery pack shown in FIG. 1 with a cover member removed.
Figure 4:
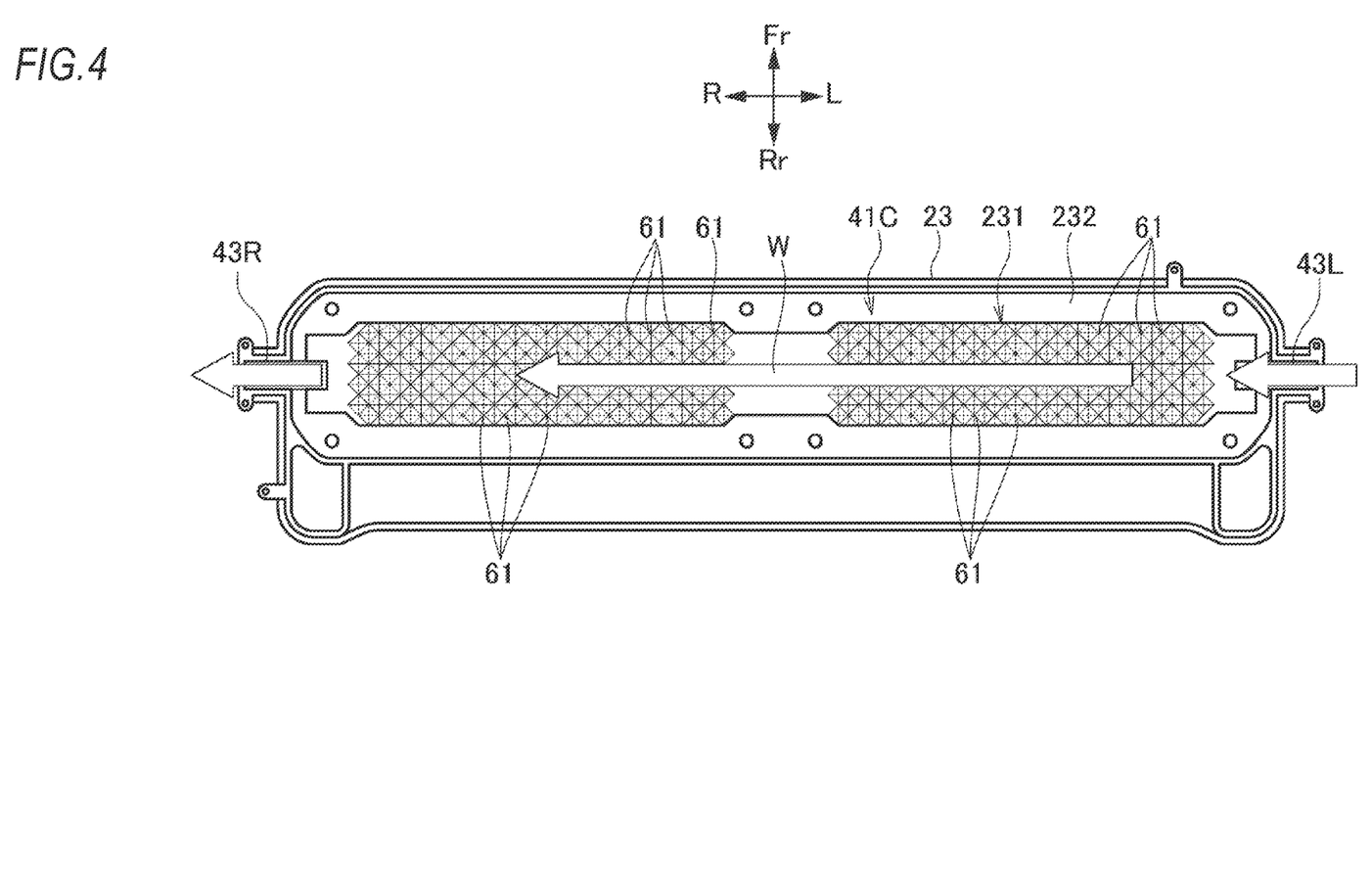
FIG. 4 is a bottom view showing a second battery pack shown in FIG. 1.

As shown in FIGS. 3 to 5, the first cooling mechanism 40A that cools the battery module 11 and the second cooling mechanism 40B that cools the battery modules 21, 22 include a series of refrigerant flow paths 41 through which a liquid medium W passes. Examples of the liquid medium W include water, oil, automatic transmission fluid (ATF), or the like. More specifically, the refrigerant flow path 41 includes a lower right side flow path portion 41A for cooling the first battery module 11A and the second battery module 11B accommodated in the right side region of the first battery case body 12, a lower left side flow path portion 41B for cooling the battery modules 11C, 11D accommodated in the left side region of the first battery case body 12, and an upper flow path portion 41C for cooling the battery modules 21, 22 of the second battery pack 20. The blank arrows shown in FIGS. 3 to 5 conceptually show the liquid medium W and its flow directions.

In the present example, the liquid medium W flows into the lower left side flow path portion 41B from a refrigerant inlet 42in to cool the battery modules 11C, 11D accommodated in the left side region of the first battery case body 12, goes up through an inside of a vertical pipe 43L provided in a left sidewall of the first battery case body 12 and enters the upper flow path portion 41C to cool the battery modules 21, 22 of the second battery pack 20, goes down through an inside of a vertical pipe 43R provided in a right sidewall of the first battery case body 12 and enters the lower right side flow path portion 41A to cool the first battery module 11A and the second battery module 11B accommodated in the right side region of the first battery case body 12, and then flows out from a refrigerant outlet 42out. With such a configuration, all the battery modules 11, 21, 22 of the battery unit 1 are cooled by the liquid medium W.

As shown in FIG. 3, a lower surface 121a of a bottom portion 121 of the first battery case body 12 is divided into a right portion and a left portion, and concave portions 122R, 122L are provided therein, respectively, and the concave portion 122R in the right side portion is sealed with a right side cover member 14R shown in FIG. 2, so that the lower right side flow path portion 41A is formed, and the concave portion 122L in the left side portion is sealed with a left side cover member 14L shown in FIG. 2, so that the lower left side flow path portion 41B is formed. As described above, by sealing the concave portions 122R, 122L provided on the lower surface 121a of the bottom portion 121 of the first battery case body 12 with the cover members 14R, 14L, the lower right side flow path portion 41A and the lower left side flow path portion 41B configuring a portion of the refrigerant flow path 41 can be easily formed with the concave portions 122R, 122L and the cover members 14R, 14L of the first battery case body 12. Note that the cover members 14R, 14L may be integrated.

As shown in FIG. 4, a concave portion 231 is provided on a lower surface 232 of the second battery case body 23, and the concave portion 231 is sealed with the first battery case cover 13 (FIG. 2), so that the upper flow path portion 41C is formed. As described above, by sealing the concave portion 231 provided on the lower surface 232 of the second battery case body 23 with the first battery case cover 13, the upper flow path portion 41C configuring a portion of the refrigerant flow path 41 can be easily formed with the concave portion 231 of the second battery case body 23 and the first battery case cover 13.

As described above, since a part of the refrigerant flow path 41 is configured with the first battery case body 12 and the second battery case body 23, which are the components of the battery unit 1, the battery unit 1 can be efficiently cooled with the liquid medium W while preventing an increase in the number of parts.

Figure 8:
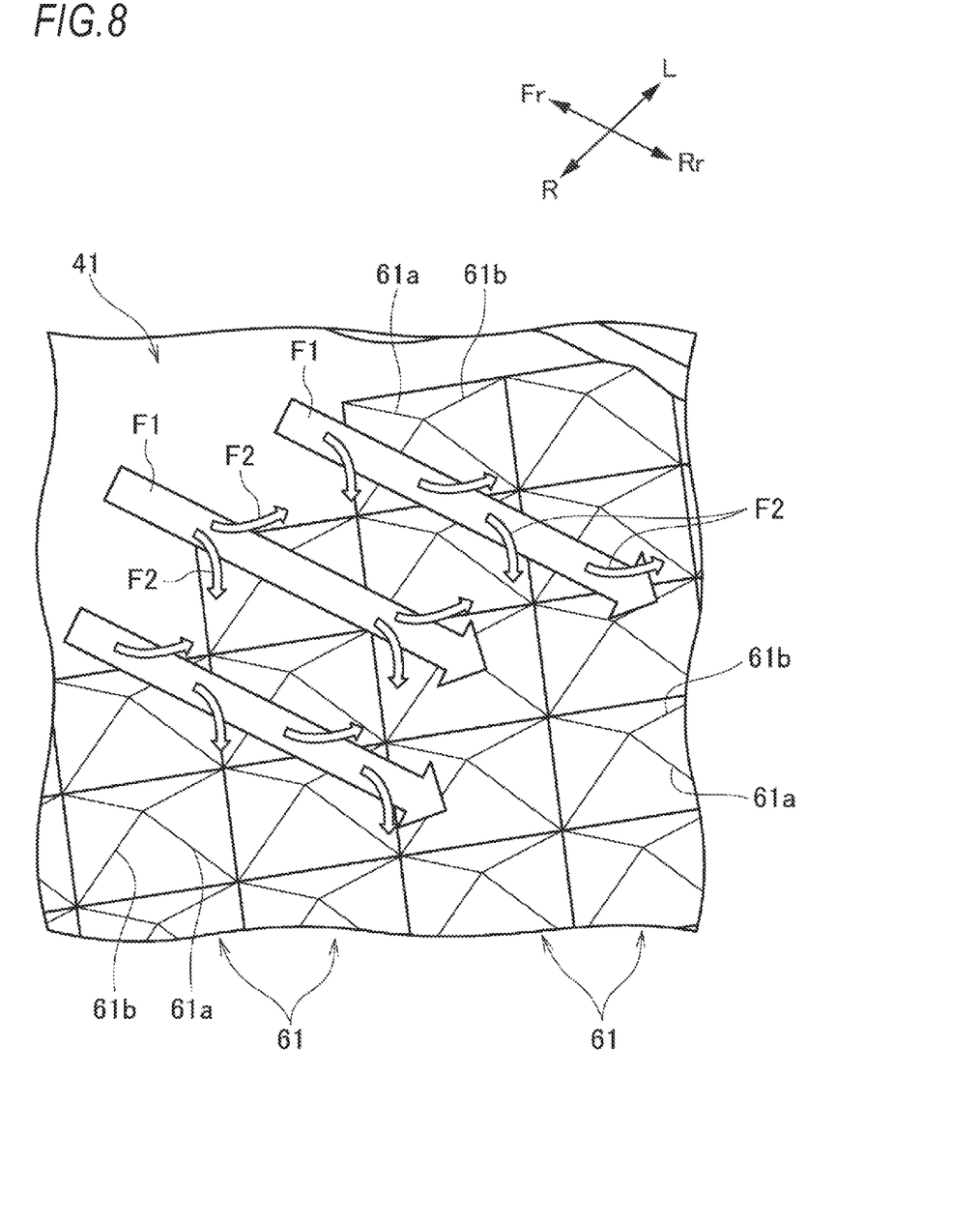
FIG. 8 is an explanatory diagram showing how a liquid refrigerant flows in the refrigerant flow path shown in FIG. 5.

As shown in FIGS. 3 and 4, the concave portions 122R, 122L, 231 include a plurality of convex portions 61 arranged in a staggered manner along the forward-rearward direction and the leftward-rightward direction. As shown in FIG. 8, each convex portion 61 has a pyramid shape, and one of two diagonal lines 61a, 61b of the convex portion 61, that is, the diagonal line 61a is arranged to coincide with the forward-rearward direction, and the other one of the two diagonal lines 61a, 61b of the convex portion 61, that is, the diagonal line 61b is arranged to coincide with the leftward-rightward direction.

As described above, the plurality of convex portions 61 are arranged in a staggered manner along the forward-rearward direction and the leftward-rightward direction that is orthogonal to the forward-rearward direction, so that the liquid medium W flows through the refrigerant flow path 41 while forming turbulent flow, thereby increasing the heat exchange efficiency between the liquid medium W and the first battery case body 12 and the second battery case body 23, and improving the cooling performance.

Each convex portion 61 has a quadrangular pyramid shape including a square bottom surface, and in the lower right side flow path portion 41A and the lower left side flow path portion 41B, one diagonal line 61a of the two diagonal lines 61a, 61b is arranged to coincide with the forward-rearward direction which is the stacking direction of the cells. As a result, as shown in FIG. 8, the flow F of the refrigerant in the stacking direction of the cells is appropriately blocked, and the flow F2 in the direction intersecting therewith is generated, thereby easily generating turbulent flow. Therefore, the liquid medium W can spread over the entire lower right side flow path portion 41A and lower left side flow path portion 41B. The efficiency of heat exchange between the liquid medium W and the battery module 11 performed through the bottom portion 121 of the first battery case body 12 is increased, thereby further improving the cooling performance.

Likewise, in the upper flow path portion 41C, one diagonal line 61b of the two diagonal lines 61a, 61b is arranged to coincide with the leftward-rightward direction which is the stacking direction of the cells. As a result, the flow of the refrigerant in the stacking direction of the cells is appropriately blocked, and the flow in the direction intersecting therewith is generated, thereby easily generating turbulent flow. Accordingly, the liquid medium W can spread over the entire upper flow path portion 41C. The efficiency of heat exchange between the liquid medium W and the battery modules 21, 22 performed through the second battery case body 23 is increased, thereby further improving the cooling performance.

As shown in FIGS. 3 and 5, the lower right side flow path portion 41A includes a first refrigerant flow path 41Aa provided on the opposite side of the bottom portion 121, which is as a partition wall of the first battery case body 12, from the first battery module 11A in the upward-downward direction, a second refrigerant flow path 41Ab provided on the opposite side of the bottom portion 121 from the second battery module 11B in the upward-downward direction, and a connection flow path 41Ac connecting respective rear ends in the forward-backward direction of the first refrigerant flow path 41Aa and the second refrigerant flow path 41Ab to each other and extending in the leftward-rightward direction.

Similarly, the lower left side flow path portion 41B includes a third refrigerant flow path 41Ba provided on the opposite side of the bottom portion 121 of the first battery case body 12 from the battery module 11C in the upward-downward direction, a fourth refrigerant flow path 41Ba provided on the opposite side of the bottom portion 121 from the battery module 11D in the upward-downward direction, and a connection flow path 41Bc connecting respective rear ends of the third refrigerant flow path 41Ba and the fourth refrigerant flow path 41Bb to each other and extending in the leftward-rightward direction.

Figure 6:
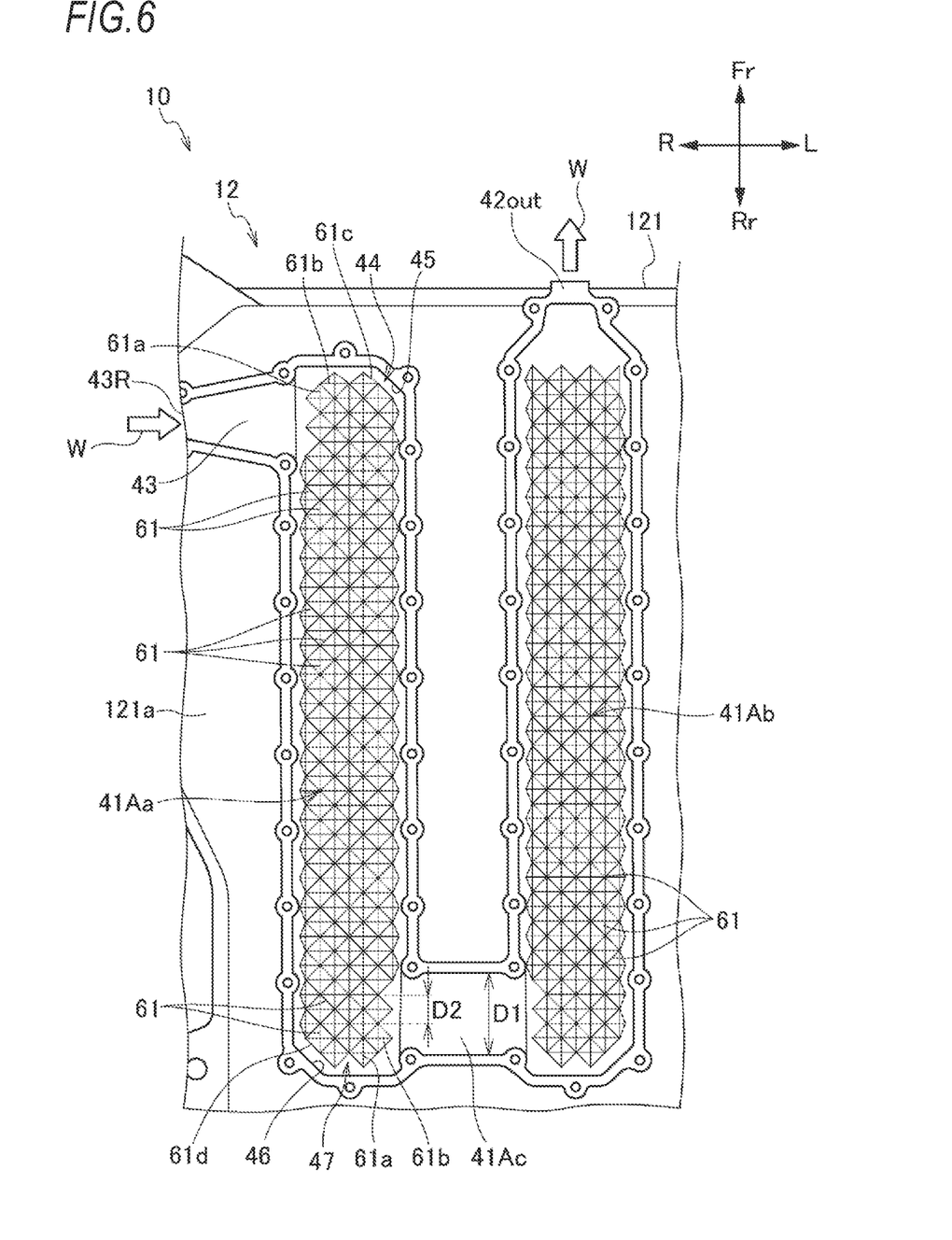
FIG. 6 is an enlarged view showing a portion surrounded by a double-dashed chain line in FIG. 3.

As shown in FIGS. 3, 5 and 6, the lower right side flow path portion 41A includes a refrigerant inflow portion 43 for introducing the liquid medium W flowing from the upper flow path portion 41C into the first refrigerant flow path 41Aa. The refrigerant inflow portion 43 is provided on the front end, which is opposite to the rear end where the connection flow path 41 Ac is provided in the forward-rearward direction, and on the right side, which is the opposite side from the left side where the connection flow path 41Ac is provided in the leftward-rightward direction, and is configured such that the liquid medium W is introduced from the refrigerant inflow portion 43 along the leftward-rightward direction. As described above, the refrigerant inflow portion 43 is provided on the opposite side of the first refrigerant flow path 41Aa from the connection flow path 41Ac in the forward-rearward direction and the leftward-rightward direction, and the liquid medium W is introduced along the leftward-rightward direction, so that the liquid medium W spreads to both ends of a cell in the first battery module 11A located in the vicinity of the refrigerant inflow portion 43. That is, when the liquid medium W is made to flow into the first refrigerant flow path 41Aa in a direction along the stacking direction of the cells of the first battery module 11A, the liquid medium W is less likely to spread to both ends of the cell in the vicinity of the refrigerant inflow portion 43, but by causing the liquid medium W to flow into the first refrigerant flow path 41Aa in the direction orthogonal to the stacking direction of the cells, the liquid medium W can evenly spread over an entire upstream end portion 44 (FIG. 6) of the first refrigerant flow path 41Aa by the synergistic effect of the flow direction of the liquid medium W and the turbulent flow generation by the convex portion 61.

As shown in FIGS. 3, 5 and 6, the first refrigerant flow path 41Aa includes an inflow side corner portion 45 located on the front end, which is the refrigerant inflow portion 43 side end in the forward-rearward direction, and on the left side, which is the opposite side from the refrigerant inflow portion 43 in the leftward-rightward direction. As shown in FIG. 6, the inflow side corner portion 45 is inclined with respect to the forward-rearward direction and the leftward-rightward direction along one side 61c of the quadrangular pyramid-shaped convex portion 61. As described above, the inflow side corner portion 45 is inclined with respect to the forward-rearward direction and the leftward-rightward direction along the one side 61c of the quadrangular pyramid-shaped convex portion 61, so that the liquid medium W introduced from the refrigerant inflow portion 43 can smoothly flow toward the downstream side of the first refrigerant flow path 41Aa thereby reducing pressure loss.

The first refrigerant flow path 41Aa includes a connection flow path side corner portion 46 located on the rear end opposite to the refrigerant inflow portion 43 side end in the forward-rearward direction, and on the right side which is the refrigerant inflow portion 43 side in the leftward-rightward direction. As shown in FIG. 6, the connection flow path side corner portion 46 is inclined with respect to the forward-rearward direction and the leftward-rightward direction along one side 61d of the quadrangular pyramid-shaped convex portion 61. As described above, the connection flow path side corner portion 46 is inclined with respect to the forward-rearward direction and the leftward-rightward direction along the one side 61d of the quadrangular pyramid-shaped convex portion 61, so that the liquid medium W can smoothly flow toward the connection flow path 41Ac, thereby reducing pressure loss.

The width D1 of the connection flow path 41Ac in the forward-rearward direction is greater than the length D2 of the diagonal line 61a that coincides with the forward-rearward direction of the convex portion 61 provided in the first refrigerant flow path 41Aa. As described above, the width D1 of the connection flow path 41Ac in the forward-rearward direction is greater than the length D2 of the diagonal line 61a of the convex portion 61 in the forward-rearward direction, so that the liquid medium W can be prevented from staying at the inlet of the connection flow path 41Ac.

Figure 7:
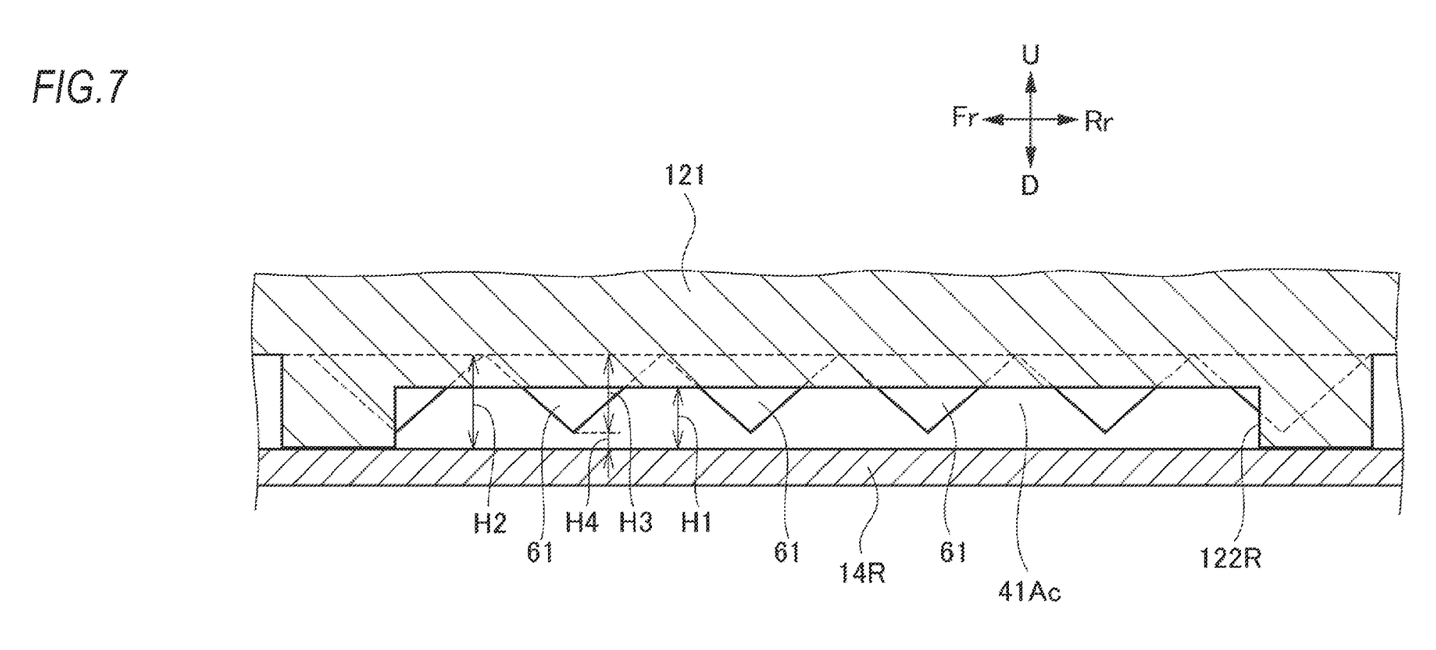
FIG. 7 is a cross-sectional view showing the refrigerant flow path taken along the line A-A of FIG. 3.

As shown in FIG. 7, the height H1 of the connection flow path 41Ac is equal to or less than the maximum height H2 of the first refrigerant flow path 41Aa, that is, the height obtained by adding up the height H3 of the convex portion 61, and the distance H4 between the apex of the convex portion 61 and the cover member 14R of the first refrigerant flow path 41Aa. As described above, by making the height of the connection flow path 41Ac to be equal to or less than the maximum height H2 of the first refrigerant flow path 41Aa, the liquid medium W can spread to the connection flow path side corner portion 46. That is, if the height of the connection flow path 41Ac is too large, it is difficult for the liquid medium W to flow to the connection flow path side corner portion 46, and accordingly, by making the height of the connection flow path 41Ac to be equal to or less than the maximum height H2 of the first refrigerant flow path 41Aa, the liquid medium W can evenly spread over the entire downstream end portion 47 (FIG. 6) of the first refrigerant flow path 41Aa.

Note that the present disclosure is not limited to the embodiments described above, and may be appropriately modified, improved, or the like.

For example, in the embodiments described above, the battery unit 1 has a two-story structure including the first battery pack 10 and the second battery pack 20, but may instead have a one-story structure including only the first battery pack 10.

In the embodiments described above, while each convex portion 61 has a quadrangular pyramid shape including a square bottom surface, it may have a quadrangular pyramid shape including a rectangular bottom surface.

At least the following matters are described in the present specification. Note that, while the corresponding component or the like from the embodiment described above are shown in parenthesis, the present disclosure is not limited thereto.

[1] A battery pack (first battery pack 10) includes a plurality of battery modules (battery module 11) configured by stacking a plurality of cells in a first direction (forward-rearward direction), and a cooling mechanism (first cooling mechanism 40A) that cools the plurality of battery modules with a liquid medium (liquid medium W). The plurality of battery modules include at least a first battery module (first battery module 11A) and a second battery module (second battery module 11B), which are arranged side by side in a second direction (leftward-rightward direction) orthogonal to the first direction. The cooling mechanism includes: a first refrigerant flow path (first refrigerant flow path 41Aa) provided on the opposite side of a partition wall (bottom portion 121 of the first battery case body 12) from the first battery module in a third direction (upward-downward direction) orthogonal to the first direction and the second direction, a second refrigerant flow path (second refrigerant flow path 41Ab) provided on the opposite side of the partition wall from the second battery module in the third direction, and a connection flow path (connection flow path 41Ac) connecting respective first ends (rear ends) in the first direction of the first refrigerant flow path and the second refrigerant flow path to each other and extending in the second direction. In the partition wall, a plurality of convex portions (convex portions 61) are arranged in a staggered manner along the first direction and the second direction inside the first refrigerant flow path and the second refrigerant flow path, each convex portion has a pyramid shape, one (diagonal line 61a) of the two diagonal lines (diagonal lines 61a, 61b) of the convex portion is arranged to coincide with the first direction, and another one (diagonal line 61b) of the two diagonal lines of the convex portion is arranged to coincide with the second direction.

According to [1], one of the two diagonal lines of every convex portion provided in the partition wall coincides with the stacking direction of the cells (first direction), and the other one of the two diagonal lines is arranged to coincide with the extending direction (second direction) of the connection flow path, so that the refrigerant can spread to the corners of the first refrigerant flow path. As a result, the efficiency of heat exchange between the liquid medium and the first battery module, which is performed through the partition wall, is increased, thereby improving the cooling performance of the first battery module.

[2] In the battery pack described in [1], the cooling mechanism may include a refrigerant inflow portion (refrigerant inflow portion 43) for introducing the liquid medium into the first refrigerant flow path, the refrigerant inflow portion may be provided on a second end (front end) of the first refrigerant flow path opposite to the first end (rear side) in the first direction, and on the opposite side (right side) of the first refrigerant flow path from the connection flow path in the second direction, and the refrigerant inflow portion may introduce the liquid medium along the second direction.

According to [2], the refrigerant inflow portion is provided on the opposite side from the connection flow path in the first direction and the second direction, and introduces the liquid medium along the second direction, so that the liquid refrigerant can spread to both ends of the cell in the vicinity of the refrigerant inflow portion.

[3] In the battery pack according to [2], the pyramid shape may be a quadrangular pyramid shape, the first refrigerant flow path may include an inflow side corner portion (inflow side corner portion 45) located on the second end (front end) of the first refrigerant flow path and on the opposite side (left side) of the first refrigerant flow path from the refrigerant inflow portion in the second direction, and the inflow side corner portion may be inclined with respect to the first direction and the second direction along one side (one side 61c) of the convex portion.

According to [3], the inflow side corner portion is inclined with respect to the first direction and the second direction along one side of the quadrangular pyramid-shaped convex portion, so that the liquid medium can be smoothly flowed toward the downstream side of the first refrigerant flow path, thereby reducing pressure loss.

[4] In the battery pack according to [2] or [3], the pyramid shape may be a quadrangular pyramid shape, the first refrigerant flow path may include a connection flow path side corner portion (connection flow path side corner portion 46) located on the first end (rear end) of the first refrigerant flow path and on a same side (right side) of the first refrigerant flow path as the refrigerant inflow portion in the second direction, and the connection flow path side corner portion may be inclined with respect to the first direction and the second direction along one side (one side 61d) of the convex portion.

According to [4], the connection flow path side corner portion is inclined with respect to the first direction and the second direction along one side of the quadrangular pyramid-shaped convex portion, so that the liquid medium can be smoothly flowed toward the connection flow path, thereby reducing pressure loss.

[5] In the battery pack according to any one of [1] to [4], the width (width D1) of the connection flow path in the first direction may be greater than the length (length D2) of the diagonal line that coincides with the first direction of the convex portion provided in the first refrigerant flow path.

According to [5], the width of the connection flow path in the first direction is greater than the length of the diagonal line of the convex portion in the first direction, and accordingly, the liquid medium can be prevented from staying at the inlet of the connection flow path.

[6] In the battery pack according to any one of [1] to [5], in the third direction, the height (height H1) of the connection flow path may be equal to or less than the maximum height (maximum height H2) of the first refrigerant flow path.

According to [6], the height of the connection flow path is made to be equal to or less than the maximum height of the first refrigerant flow path, so that the liquid medium can spread to the connection flow path side corner portion.

[7] In the battery pack according to anyone of [1] to [6], the partition wall may be a bottom portion (bottom portion 121) of a case (first battery case body 12) that accommodates the plurality of battery modules and the cooling mechanism, a concave portion (concave portion 122R) may be provided on the lower surface (lower surface 121a) of the bottom portion, the concave portion may be sealed with a cover member (cover member 14R), and the cooling mechanism may be configured with the concave portion of the case and the cover member.

According to [7], a plurality of convex portions are formed in the concave portion provided in the bottom portion of the battery case, and the concave portion is sealed with the cover member, thereby easily forming the refrigerant flow path.

What is claimed is:
1. A battery pack comprising:
a plurality of battery modules configured by stacking a plurality of cells in a first direction; and a cooling mechanism for cooling the plurality of battery modules with a liquid medium, the plurality of battery modules including at least a first battery module and a second battery module arranged side by side in a second direction orthogonal to the first direction, the cooling mechanism including:
- a first refrigerant flow path provided on an opposite side of a partition wall from the first battery module in a third direction orthogonal to the first direction and the second direction;
- a second refrigerant flow path provided on the opposite side of the partition wall from the second battery module in the third direction; and
- a connection flow path connecting respective first ends in the first direction of the first refrigerant flow path and the second refrigerant flow path to each other and extending in the second direction, wherein the partition wall includes a plurality of convex portions arranged in a staggered manner along the first direction and the second direction inside the first refrigerant flow path and the second refrigerant flow path, each convex portion has a pyramid shape, one of two diagonal lines of the convex portion is arranged to coincide with the first direction, and another one of the two diagonal lines of the convex portion is arranged to coincide with the second direction.

2. The battery pack according to claim 1, wherein the cooling mechanism includes a refrigerant inflow portion for introducing the liquid medium into the first refrigerant flow path, the refrigerant inflow portion is provided on a second end of the first refrigerant flow path opposite to the first end in the first direction, and on an opposite side of the first refrigerant flow path from the connection flow path in the second direction, and the refrigerant inflow portion introduces the liquid medium along the second direction.

3. The battery pack according to claim 2, wherein the pyramid shape is a quadrangular pyramid shape, the first refrigerant flow path includes an inflow side corner portion located on the second end of the first refrigerant flow path and on the opposite side of the first refrigerant flow path from the refrigerant inflow portion in the second direction, and the inflow side corner portion is inclined with respect to the first direction and the second direction along one side of the convex portion.

4. The battery pack according to claim 2, wherein the pyramid shape is a quadrangular pyramid shape, the first refrigerant flow path includes a connection flow path side corner portion located on the first end of the first refrigerant flow path and on a same side of the first refrigerant flow path as the refrigerant inflow portion in the second direction, and the connection flow path side corner portion is inclined with respect to the first direction and the second direction along one side of the convex portion.

5. The battery pack according to claim 1, wherein a width of the connection flow path in the first direction is greater than a length of the diagonal line that coincides with the first direction of the convex portion provided in the first refrigerant flow path.

6. The battery pack according to claim 1, wherein in the third direction, a height of the connection flow path is equal to or less than a maximum height of the first refrigerant flow path.

7. The battery pack according to claim 1, wherein the partition wall is a bottom portion of a case that accommodates the plurality of battery modules and the cooling mechanism, the lower surface of the bottom portion is provided with a concave portion, the concave portion is sealed with a cover member, and the cooling mechanism is configured with the concave portion of the case and the cover member.

* * * * *